United States Patent
Oh et al.

(10) Patent No.: US 8,543,231 B2
(45) Date of Patent: Sep. 24, 2013

(54) METHOD AND AN APPARATUS FOR PROCESSING A SIGNAL

(75) Inventors: Hyen-O Oh, Seoul (KR); Yang Won Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 626 days.

(21) Appl. No.: 12/746,853

(22) PCT Filed: Dec. 9, 2008

(86) PCT No.: PCT/KR2008/007275
§ 371 (c)(1),
(2), (4) Date: Jul. 13, 2010

(87) PCT Pub. No.: WO2009/075511
PCT Pub. Date: Jun. 18, 2009

(65) Prior Publication Data
US 2010/0286804 A1    Nov. 11, 2010

Related U.S. Application Data

(60) Provisional application No. 61/012,452, filed on Dec. 9, 2007, provisional application No. 61/020,362, filed on Jan. 10, 2008.

(51) Int. Cl.
*G06F 17/00* (2006.01)
(52) U.S. Cl.
USPC .......... 700/94; 381/17; 381/23; 384/285; 384/321; 369/4; 369/5
(58) Field of Classification Search
USPC .................................................. 700/94
See application file for complete search history.

(56) References Cited

U.S. PATENT DOCUMENTS 6,782,366 B1 *  8/2004  Huang et al. ................. 704/500
7,496,418 B2 *  2/2009  Kim et al. ...................... 700/94
(Continued)

FOREIGN PATENT DOCUMENTS

EP        1668959 B1       1/2007
KR    10-2007-0081735 A    8/2007
WO    WO 2007/004828 A2    1/2007

OTHER PUBLICATIONS

ID3v2 draft specification; copyright Nov. 1, 2000.*

(Continued)

*Primary Examiner* — Paul McCord
(74) *Attorney, Agent, or Firm* — Birch, Stewart, Kolasch & Birch, LLP

(57) ABSTRACT

A method of processing a signal is disclosed, which includes receiving a downmix signal, object information and rendering information; obtaining downmix gain flag information indicating whether a downmix gain is included in the object information; and generating downmix processing information using the object information and the rendering information based on the downmix gain flag information, wherein the object information includes modified object level information or object level information, wherein the modified object level information is determined using a level of a modified object generated by applying the downmix gain to an object, and wherein the object level information is determined using a level of the object. Accordingly, in an apparatus for processing a signal and method thereof according to the present invention, the signal is decoded using modified object level information based on downmix gain flag information. Therefore, the present invention enables to select an efficient signal processing method according to an environment.

8 Claims, 8 Drawing Sheets

(56) References Cited

U.S. PATENT DOCUMENTS

| | | | |
|---|---|---|---|
| 7,502,743 B2* | 3/2009 | Thumpudi et al. | 704/500 |
| 7,805,313 B2* | 9/2010 | Faller et al. | 704/500 |
| 2005/0157883 A1* | 7/2005 | Herre et al. | 381/17 |
| 2005/0180579 A1* | 8/2005 | Baumgarte et al. | 381/63 |
| 2006/0085200 A1* | 4/2006 | Allamanche et al. | 704/500 |
| 2006/0115100 A1* | 6/2006 | Faller | 381/119 |
| 2006/0256776 A1* | 11/2006 | Gladyshev et al. | 370/352 |
| 2007/0140499 A1* | 6/2007 | Davis | 381/23 |
| 2007/0206690 A1* | 9/2007 | Sperschneider et al. | 375/260 |
| 2007/0236858 A1* | 10/2007 | Disch et al. | 361/272 |
| 2007/0244706 A1* | 10/2007 | Tsushima | 704/500 |
| 2009/0129601 A1* | 5/2009 | Ojala et al. | 381/1 |
| 2010/0094631 A1* | 4/2010 | Engdegard et al. | 704/258 |
| 2011/0022402 A1* | 1/2011 | Engdegard et al. | 704/501 |

OTHER PUBLICATIONS

ID3v2 draft specification; copyright Mar. 26, 1998.*
MPEG 4 Specification, selected portions; ISO 14496-1; Copyright 2002.*
Breebaart et al., "Spatial Psychoacoustics as the Basis for Innovations in the Field of Audio Coding and Processing," 19th International Congress on Acoustics, Madrid, Sep. 2-7, 2007, pp. 1-6.

* cited by examiner

FIG.7

| Syntax | No. of bits | Mnemonic |
|---|---|---|
| SAOCFrame() <br> { <br>   FramingInfo(); <br>   bsIndependencyFlag: <br>   startBand=0; <br>   for(i=0; i<numObjects; i++) { <br>     [old[i], oldQuantCoarse[i], oldFreqResStride[i] ]= <br>       EcData(t_OLD, prevOldQuantCoarse[i], prevOldFreqResStride[i], <br>         numParamSets, bsIndependencyFlag, startBand, numBands) ; <br>   } <br>   if{ bsTransmitAbsNrg) { <br>     [nrg. nrgQuantCoarse, nrgFreqResStride] = <br>       EcData(t_NRG, prevOldQuantCoarse, prevNrgFreqResStride, <br>         numParamSets, bsIndependencyFlag, startBand, numBands) ; <br>   } <br>   for(i=0; i<numObjects; i++) { <br>     for(j=i+1; j<numObjects; j++) { <br>       if(bsRelatedTo[i][j] i=0) { <br>         [ioc[i][j], iocQuantCoarse[i][j], iocResStride[i][j]= <br>           EcData(t_ICC, prevOldQuantCoarse[i][j], <br>             prevIocFreqResStride[i][j], numParamSets, <br>             bsIndependencyFlag, startBand, numBands) ; <br>       } <br>     } <br>   } <br>   firstObject=0; <br>   ~~[dmg, dmgQuantCoarse, dmgFreqResStride]=~~ <br>     ~~EcData(t_CLD, prevOldQuantCoarse, prevNrgFreqResStride,~~ <br>       ~~numParamSets, bsIndependencyFlag, firstObject, numObject) ;~~ <br>   if(numDmxChannels > 1) { <br>     [cld, cldQuantCoarse, cldFreqResStride]= <br>       EcData(t_CLD, prevCldQuantCoarse, prevCldFreqResStride, <br>         numParamSets, bsIndependencyFlag, firstObject, numObject) ; <br>   } <br> } | 1 | Note 1 <br> uimsbf <br><br><br> Note 2, 3 <br><br><br><br><br> Note 2, 3 <br><br><br><br><br><br> Note 2, 3 |
| Note 1 : FramingInfo() is defined in ISO/IEC FDIS 23003-1:2006, Table 16. <br> Note 2 : EcData() is defined in ISO/IEC FDIS 23003-1:2006, Table 23. <br> Note 3 : numBands is defined in ISO/IEC FDIS 23003-1:2006, Table 39. and depends on bsFreqRes. | | |

METHOD AND AN APPARATUS FOR PROCESSING A SIGNAL

CROSS REFERENCE TO RELATED APPLICATIONS

This application is the National Phase of PCT/KR2008/007275 filed on Dec. 9, 2008, which claims priority under 35 U.S.C. 119(e) to U.S. Provisional Application Nos. 61/012,452 filed on Dec. 9, 2007 and 61/020,362 filed on Jan. 10, 2008, all of which are hereby expressly incorporated by reference into the present application.

TECHNICAL FIELD

The present invention relates to a method and an apparatus for processing an audio signal received via a digital medium, a broadcast signal or the like.

BACKGROUND ART

Generally, in the process for downmixing at least one object into a mono or stereo signal, parameters are generated by using object. Theses parameters include object level information indicating a level of the object and a downmix gain applied to the object.

DISCLOSURE OF THE INVENTION

Technical Problem

However, since a downmix signal includes at least one object to which downmix gains are applied in encoding, the downmix gain transferred to a decoder may be redundant.

Technical Solution

Accordingly, the present invention is directed to an apparatus for processing a signal and method thereof that substantially obviate one or more of the problems due to limitations and disadvantages of the related art.

An object of the present invention is to provide an apparatus for processing a signal and method thereof, by which a transmitted bit for object information can be reduced in a manner that a downmix gain is transferred by not being included in object information using a modified object generated from applying the downmix gain to an object.

Another object of the present invention is to provide an apparatus for processing a signal and method thereof, by which the signal can be decoded using downmix gain flag information indicating whether a downmix gain is included in object information or modification object level information is included in object information or using modified object level information instead of using a downmix gain.

Advantageous Effects

Accordingly, the present invention provides the following effects or advantages.

First of all, in an apparatus for processing a signal and method thereof according to the present invention, the signal is decoded using object information including modified object level information. Therefore, since a downmix gain is not transferred, the present invention is able to decode a signal using less information.

Secondly, in an apparatus for processing a signal and method thereof according to the present invention, a signal is decoded using object level information and downmix gain or using modified object level information instead of using the downmix gain, according to downmix gain flag information indicating whether the downmix gain is included in object information. Therefore, the present invention enables to select an efficient signal processing method according to an environment.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 7 is a diagram of a structure of syntax according to another embodiment of the present invention.

BEST MODE

Figure 1:
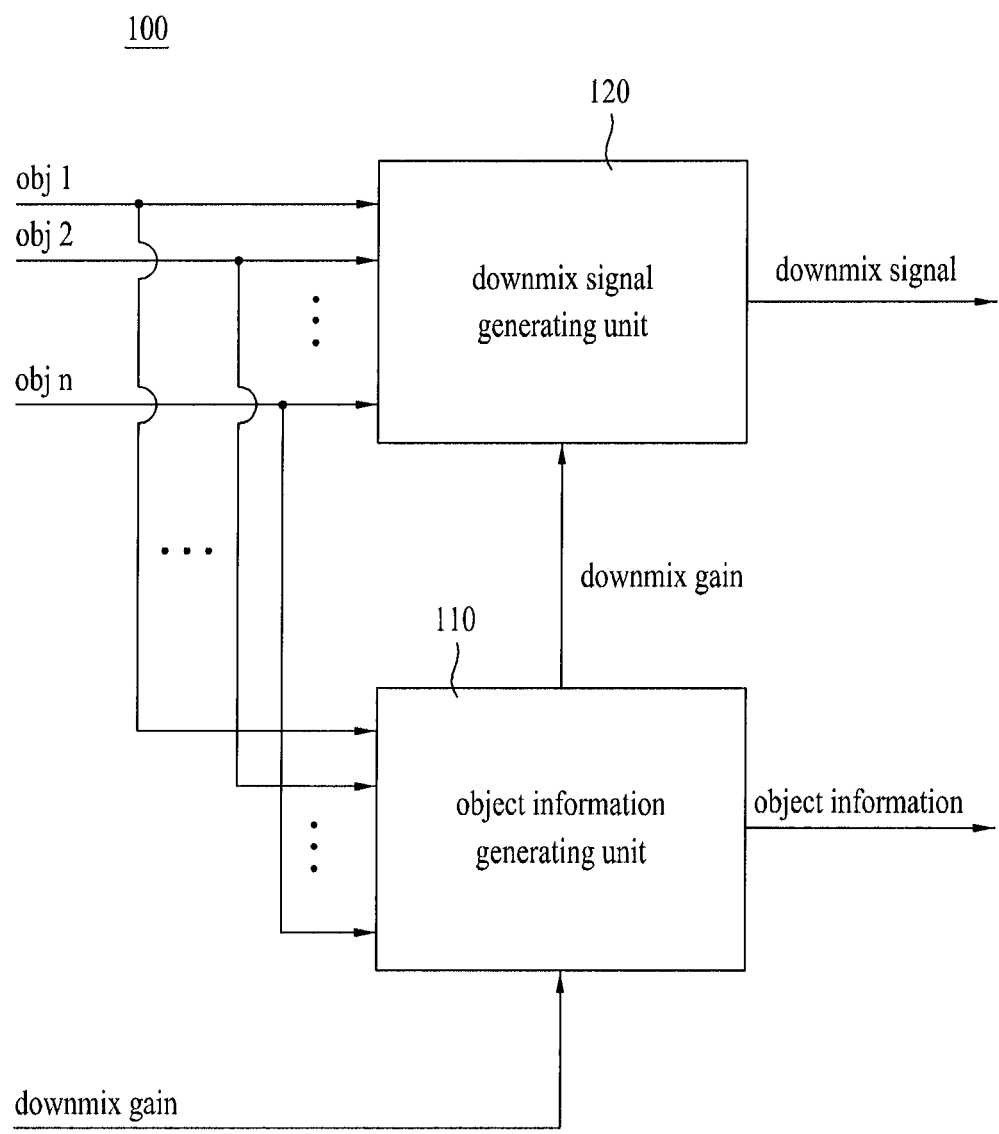
FIG. 1 is a schematic diagram of a signal encoding apparatus according to one embodiment of the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of processing an audio signal according to the present invention includes receiving a downmix signal, object information and rendering information; and generating downmix processing information using the object information and the rendering information, the object information including modified object level information, wherein the modified object level information is determined using a level of a modified object generated by applying a downmix gain to an object.

According to the present invention, the downmix gain determines a contribution degree of the object for generating the downmix signal.

According to the present invention, if a downmix signal is a stereo signal, the object information further includes object gain difference information indicating a ratio of contributing the modified object to left channel and right channel of the stereo signal.

According to the present invention, the object information does not include the downmix gain applied to the object. According to the present invention, the method can further include generating multi-channel information using the object information and the rendering information, the object information including the modified object level information; processing the downmix signal using the downmix processing information; and decoding a multi-channel audio signal by applying the multi-channel information to the downmix signal.

To further achieve these and other advantages and in accordance with the purpose of the present invention, an apparatus for processing an audio signal includes an object information processing unit generating downmix processing information and multi-channel information using object information and rendering information; and a downmix signal pre-processing unit processing a downmix signal using the downmix processing information, wherein the object information includes modified object level information determined using a level of a modified object, the modified object is generated by applying a downmix gain to an object.

To further achieve these and other advantages and in accordance with the purpose of the present invention, a method of processing an audio signal includes receiving a downmix signal, object information and rendering information; obtaining downmix gain flag information indicating whether a downmix gain is included in the object information; and generating downmix processing information using the object information and the rendering information based on the downmix gain flag information, wherein the object information includes modified object level information or object level information, wherein the modified object level information is determined using a level of a modified object generated by applying the downmix gain to an object, and wherein the object level information is determined using a level of the object.

According to the present invention, the object information includes the modified object level information, if the downmix gain flag information indicates that the downmix gain is not included in the object information. According to the present invention, the object information further includes object gain difference information indicating a ratio of contributing left channel and right channel of a stereo signal, if the downmix signal is a stereo signal.

According to the present invention, the object information includes the object level information and further includes the downmix gain applied to the object, if the downmix gain flag information indicates that the downmix gain is included in the object information According to the present invention, the downmix gain exists in a header of a bitstream of the audio signal.

To further achieve these and other advantages and in accordance with the purpose of the present invention, an apparatus for processing an audio signal includes an object information processing unit generating downmix processing information and multi-channel information using object information and rendering information; and a downmix signal pre-processing unit processing a downmix signal using the downmix processing information, wherein the object information includes modified object level information determined using a level of a modified object or object level information determined using a level of an object, based on downmix gain flag information indicating whether a downmix gain is included in the object information.

It is to be understood that both the foregoing general description and the following detailed description are exemplary and explanatory and are intended to provide further explanation of the invention as claimed.

MODE FOR INVENTION

Reference will now be made in detail to the preferred embodiments of the present invention, examples of which are illustrated in the accompanying drawings. First of all, terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's invention in best way. The embodiment disclosed in this disclosure and configurations shown in the accompanying drawings are just one preferred embodiment and do not represent all technical idea of the present invention. Therefore, it is understood that the present invention covers the modifications and variations of this invention provided they come within the scope of the appended claims and their equivalents at the timing point of filing this application.

First of all, it is understood that the concept 'coding' in the present invention includes both encoding and decoding.

Secondly, 'information' in this disclosure is the terminology that generally includes values, parameters, coefficients, elements and the like and its meaning can be construed as different occasionally, by which the present invention is non-limited. Stereo signal is taken as an example for a signal in this disclosure, by which examples of the present invention are non-limited. For example, a signal in this disclosure may include a multi-channel signal having at least three or more channels.

FIG. 1 is a schematic diagram of a signal encoding apparatus 100 according to one embodiment of the present invention.

Referring to FIG. 1, a signal encoding apparatus 100 includes an object information generating unit 110 and a downmix signal generating unit 120.

The object information generating unit 110 receives at least one object and a downmix gain and then generates object information (OI). The object information can include downmix gain and object level information indicating a level of the object. Besides, the object information generating unit 110 is able to generate a modified object by applying the downmix gain to the object. In this case, the object information includes modified object level information regarding to the modified object instead of the object level information. Details of this process will be explained with reference to FIGS. 2 to 5 later.

The downmix signal generating unit 120 receives a downmix gain and at least one object and then generates a downmix signal (DMX). In this case, the downmix signal can include a mono or stereo signal, by which examples of the present invention are non-limited.

Figure 2:
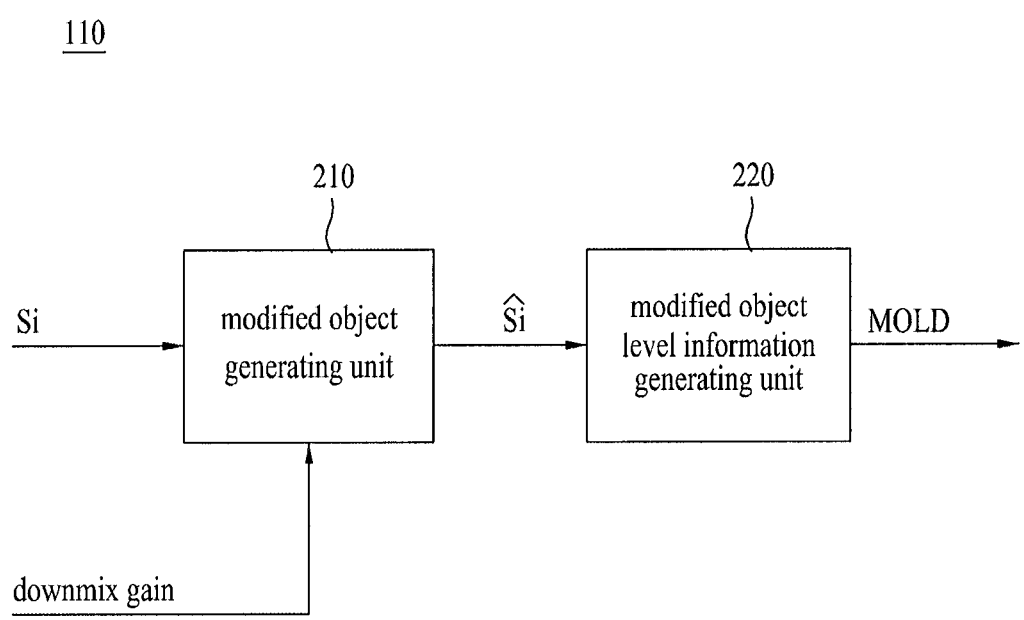
FIG. 2 is a schematic diagram of an object information generating unit according to one embodiment of the present invention.

FIG. 2 is a schematic diagram of an object information generating unit 110 according to one embodiment of the present invention. Referring to FIG. 2, an object information generating unit 110 includes a modified object generating unit 210 and a modified object level information generating unit 220.

As shown in FIG. 2, the modified object generating unit 210 receives a downmix gain $D_i$ and at least one object $S_i$ and then generates a modified object $\hat{S}_i$ by applying the downmix gain $D_i$ to the object $S_i$. The modified object $\hat{S}_i$ can be represented as Formula 1.

$$\hat{S}_i = D_i S_i \qquad \text{[Formula 1]}$$

In this case, 'i' is the number that indicates each object. For instance, a first object can be represented as $S_1$, a second object can be represented as $S_2$, a downmix gain applied to the first object can be represented as $D_1$, and a downmix gain applied to second object can be represented as $D_2$.

The modified object level information generating unit 220 generates modified object level information using a level of the modified object.

Conventional object level information (OLI) is generated from an object before a downmix gain is applied. On the contrary, modified object level information (MLOI) according to one embodiment of the present invention is estimated from a modified object generated by applying a downmix gain to an object $\hat{S}_i$.

The conventional object level information (OLD) estimated from the object and the modified object level information (MOLD) estimated from the modified object according to one embodiment of the present invention are represented as Formula 2 and Formula 3, respectively, as follows.

$$OLD_i(pb) = \frac{\sum_n \sum_{m \in pb} S_i^{n,m} S_i^{n,m*}}{\max_k \left( \sum_n \sum_{m \in pb} S_k^{n,m} S_k^{n,m*} \right)} \quad \text{[Formula 2]}$$

$$MOLD_i(pb) = \frac{\sum_n \sum_{m \in pb} \hat{S}_i^{n,m} \hat{S}_i^{n,m*}}{\max_k \left( \sum_n \sum_{m \in pb} \hat{S}_k^{n,m} \hat{S}_k^{n,m*} \right)} \quad \text{[Formula 3]}$$

In this case, '$S_i^{n,m}$' indicates an object on a sub-band defined by a time slot 'n' and a sub-band 'm'. In this following description, the 'n' and 'm' are omitted from the corresponding expression.

As mentioned in the foregoing description, modified object level information (MOLD) indicates a level of a modified object to which a downmix gain is applied. And, it will be more efficient in aspect of coding efficiency when a modified object is controlled with object information and rendering information in decoding. Therefore, object information according to one embodiment of the present invention includes modified object level information (MOLD) regarding to a modified object generated by applying a downmix gain to an object so as not to be separately transferred FIG. 3 is a flowchart for a signal encoding method in the object information generating unit shown in FIG. 2.

Figure 3:
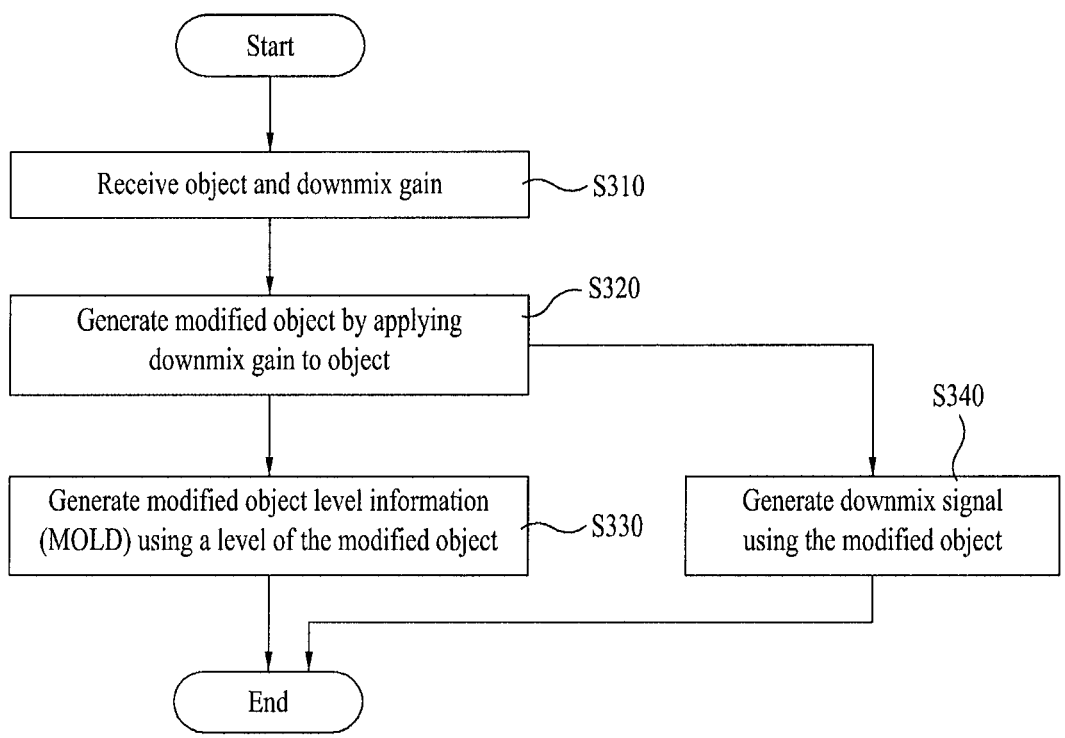
FIG. 3 is a flowchart for a signal encoding method in the object information generating unit shown in FIG. 2.

Referring to FIG. 3, an object and a downmix gain are received [S310]. A modified object is then generated by applying the downmix gain to the object according to Formula 1 [S320]. And, it is able to generate modified object level information from the generated modified object according to Formula 3 [S330].

Moreover, it is able to generate a downmix signal (DMX) using the modified object [S340]. The downmix signal can include a simple sum of the objects and can be represented as Formula 4, by which the present invention is non-limited.

$$DMX = \Sigma \hat{S}_i \quad \text{[Formula 4]}$$

Object information (OI), which is the information on at least one object, includes inter-object cross correlation information (IOC) indicating similarity degree between channels of object, absolute object energy information (NRG) indicating a reference level value for normalizing a level of an object, object level information (OLD) indicating a level of an object, a downmix gain (DMG) indicating a contribution degree of an object to channel of a downmix signal, and downmix gain difference information (DCLD) indicating gain difference of object contributing to at least two downmix channels in case that a downmix signal is stereo signal.

And, object information (OI) according to one embodiment of the present invention can further include modified object level information (MOLD) indicating a level of a modified object generated by applying a downmix gain to an object. Besides, in case that the object information (OI) includes the modified object level information (MOLD), the object information (OI) may not include a downmix gain (DMG). Therefore, a signal processing method and apparatus according to one embodiment of the present invention can reduce a transmitted bit for object information in a manner that a downmix gain (DMG) is not transferred to a decoder side.

Figure 4:
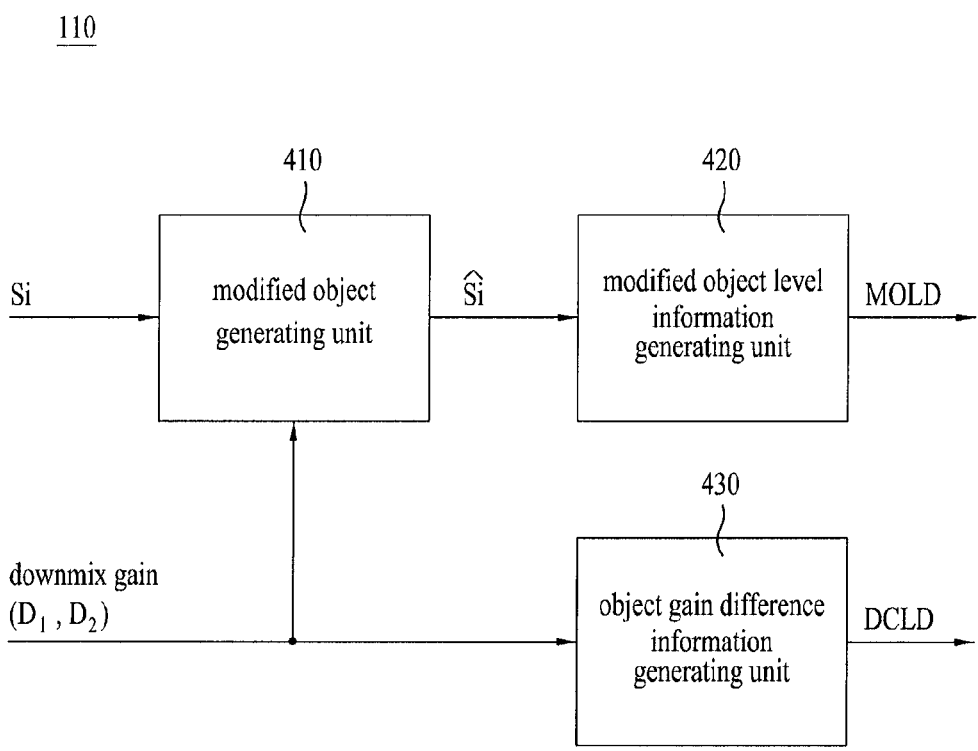
FIG. 4 is a schematic diagram of an object information generating unit shown in FIG. 2 according to another embodiment of the present invention.

FIG. 4 is a schematic diagram of an object information generating unit 110 according to another embodiment of the present invention.

Referring to FIG. 4, an object information generating unit 110 includes a modified object generating unit 410, a modified object level information generating unit 420 and an object gain difference information generating unit 430.

The modified object generating unit 410, as shown in FIG. 4, receives an object $S_i$ and a downmix gain $D_i$ and then generates a modified object $\hat{S}_i$ by applying the downmix gain $D_i$ to the object $S_i$. In case that at least one object generates a stereo downmix signal by downmixing, the downmix gain $D_i$ is the value indicating a contribution degree of an object to a stereo channel and may include a pair of values. In this case, in order to generate a modified object, it is able to derive modified downmix gains ($\hat{D}_{1,i}$, $\hat{D}_{2,i}$) to apply a normalized gain value using the downmix gains. This can be represented as Formula 5.

$$\hat{D}_{1,i} = D_{1,i}/\sqrt{D_{1,i}^2 + D_{2,i}^2} \quad \hat{D}_{2,i} = D_{2,i}/\sqrt{D_{1,i}^2 + D_{2,i}^2} \quad \text{[Formula 5]}$$

Moreover, in order to generate a modified object $\hat{S}_i$, the modified downmix gains $\hat{D}_{1,i}$ and $\hat{D}_{2,i}$ can be the normalized value represented as Formula 6.

$$\hat{D}_{1,i}^2 + \hat{D}_{2,i}^2 = 1 \quad \text{[Formula 6]}$$

The modified object generating unit 410 is able to generate a modified object $\hat{S}_i$ using the modified downmix gains normalized as Formula 6. This can be represented as Formula 7.

$$\hat{s}_i = \sqrt{D_{1,i}^2 + D_{2,i}^2} s_i \quad \text{[Formula 7]}$$

Moreover, modified objects $\hat{S}_{1,i}$ and $\hat{S}_{2,i}$ being included in a stereo downmix signal can be derived by Formula 8.

$$\hat{s}_{1,i} = \hat{D}_{1,i} \hat{s}_i, \hat{s}_{2,i} = \hat{D}_{2,i} \hat{s}_i \quad \text{[Formula 8]}$$

In Formula 8, $\hat{S}_{1,i}$ and $\hat{S}_{2,i}$ may be the modified objects being included in left channel and right channel ($\hat{S}_{1,i}$, $\hat{S}_{2,i}$) of the stereo downmix signal, respectively. They can be determined by the modified downmix gains $\hat{D}_{1,i}$ and $\hat{D}_{2,i}$.

The modified object level information generating unit 420 generates modified object level information (OLD) by estimating modified object level information using the modified object $\hat{S}_i$. In case that a generated downmix signal is a stereo signal, the object gain difference information generating unit 430 is further included. The object gain difference information generating unit 430 derives object gain difference information (DCLD) not using the modified downmix gains $\hat{D}_{1,i}$ and $\hat{D}_{2,i}$ used to generate a modified object but using downmix gains $D_{1,i}$ and $D_{2,i}$ inputted to the modified object generating unit 410. The derived object gain difference information (DCLD) is represented as Formula 9, by which examples of the present invention are non-limited. Moreover, it is able to derive object gain difference information (DCLD) using the amended downmix gains $\hat{D}_{1,i}$ and $\hat{D}_{2,i}$ as well.

$$DCLD_i = 10\log_{10}\left(\frac{D_{1,i}^2}{D_{2,i}^2}\right) \quad \text{[Formula 9]}$$

The modified object level information (MOLD) generated by the modified object level information generating unit 420 and the object gain difference information (DCLD) generated by the object gain difference information generating unit 430 can be contained in the object information (OI) and be transmitted. On the contrary, the object information (OI) includes the modified object level information (MOLD) only without including the object level information (OLD) and the downmix gain (DMG) to a decoder side. Therefore, it is able to reduce a used bit for object information.

Figure 5:
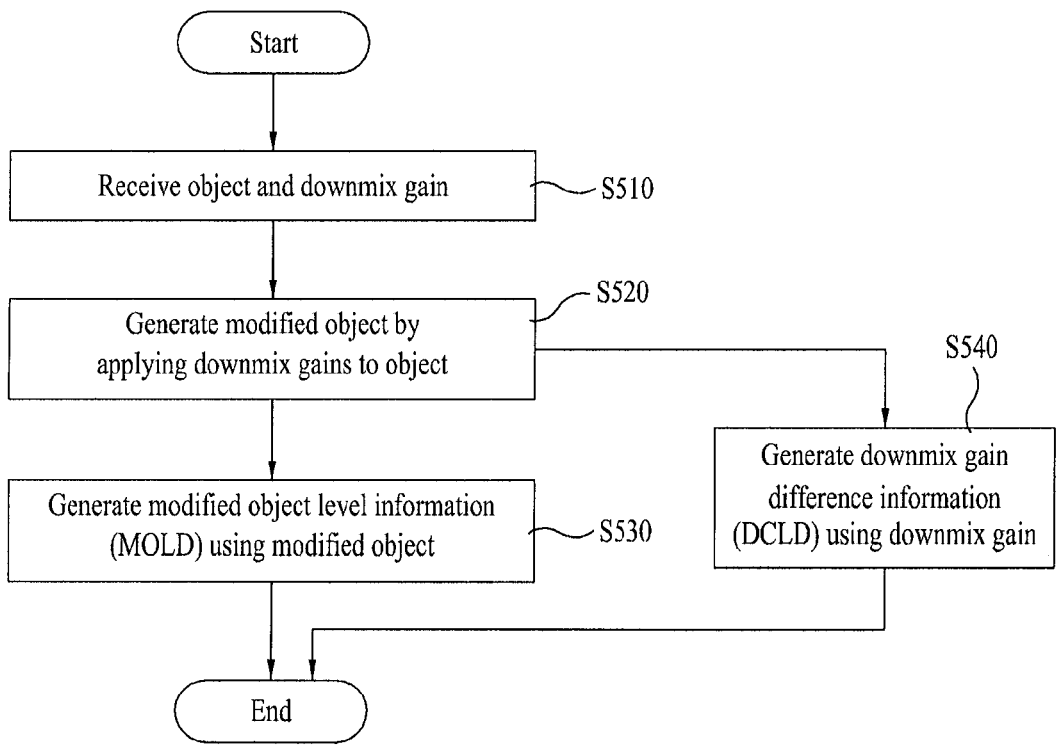
FIG. 5 is a flowchart for a signal encoding method in the object information generating unit shown in FIG. 4.

FIG. 5 is a flowchart for a signal encoding method in the object information generating unit shown in FIG. 4.

Referring to FIG. 5, an object and a downmix gain are received [S510]. A modified object is then generated by applying the downmix gains to the object according to Formula 7 [S520].

Subsequently, it is able to generate modified object level information (MOLD) and a downmix signal (DMX) using the modified object [S530]. The modified object level information (MOLD) indicates a level of a modified object by applying a downmix gain to an object.

If the modified object level information is included in object information (OI), a downmix gain (DMG) may not be included in the object information. In this case, the downmix signal (DMG) can be simply generated from a sum of modified objects.

And, it is able to generate downmix gain difference information (DCLD), as represented as Formula 9, using downmix gains. In this case, the downmix gain difference information (DCLD) indicates a gain difference of an object contributing to each channel of a downmix signal.

As mentioned in the above description, in a signal processing method and apparatus according to another embodiment of the present invention, a modified object is generated and used, whereby a downmix gain (DMG) is not transmitted to a decoder side. If a downmix signal is a mono, modified object level information (MOLD) is transmitted. If a downmix signal is a stereo signal, modified object level information (MOLD) and downmix gain difference information (DCLD) are transmitted. Therefore, the present invention is able to reduce a used bit for object information.

Figure 6:
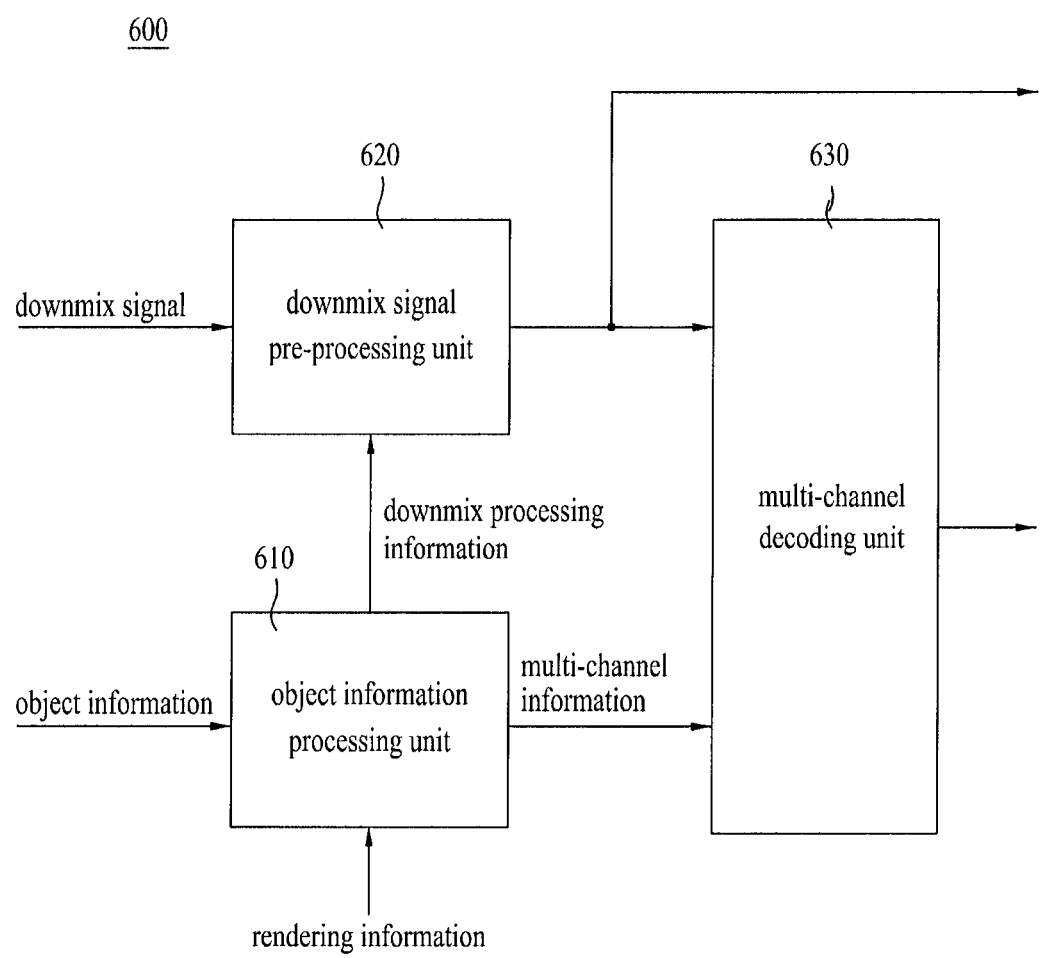
FIG. 6 is a schematic diagram of a signal decoding apparatus according to another embodiment of the present invention.

FIG. 6 is a schematic diagram of a signal decoding apparatus 600 according to an embodiment of the present invention.

Referring to FIG. 6, a signal decoding apparatus 600 includes an object information processing unit 610, a downmix signal pre-processing unit 620 and a multi-channel decoding unit 630.

The object information processing unit 610 receives object information (OI) and rendering information (RI) and then generates downmix processing information (DPI) and multi-channel information (MI) by using object information and rendering information.

In this case, the object information (OI) can include object level information (OLD), downmix gain (DMG) and downmix gain difference information (DCLD). On the other hand, in case that modified object level information (MOLD) is included in the object information (OI) instead of object level information (OLD), the downmix gain (DMG) is not included. Only if a downmix signal is a stereo signal, the object information (OI) can further include the downmix gain difference information (DCLD).

Whether the object information (OI) includes the modified object level information (MOLD) or whether the object information (OI) includes the downmix gain (DMG) can be determined based on downmix gain flag information (DMG_flag). Details of this process will be explained with reference to FIG. 8 later.

In case that a downmix signal is a stereo signal, the downmix processing information (DPI) generated by the object information processing unit 610 is used to control a signal on one channel of the stereo signal to the other channel [hereinafter, this is called 'panning'].

Based on the downmix gain flag information (DMG_flag), the object information processing unit 610 generates multi-channel information (MI) for upmixing a downmix signal into a multi-channel signal using object information (OI) further including absolute level information (absolute object energy: NRG) indicating an energy level of an object having a highest energy level and inter-object correlation information (inter-object cross correlation: IOC) as well as the modified object level information (MOLD) and the downmix gain difference information (DCLD). In this case, the multi-channel information (MI) is able to include inter-channel level difference information (CLD), inter-channel correlation information (ICC) and channel prediction information (CPC).

On the other hand, based on the downmix gain flag information, it is able to generate multi-channel information (MI) using object information (OI) that includes object level information (OLD), downmix gain (DMG) and downmix gain difference information (DCLD).

The downmix signal pre-processing unit 620 receives the downmix signal (DMX) and the downmix processing information (DPI) and is then able to generate a processed downmix signal (processed DMX: PDMX). The downmix processing information (DPI) is applied to the downmix signal to control for panning an object and a level of an object. Therefore, the downmix processing information (DPI) is applicable only if the downmix signal is a stereo signal.

The multi-channel decoding unit 630 is able to decode an audio signal having a multi-channel by applying the multi-channel information (MI) to the processed downmix signal (PDMX) outputted from the downmix signal pre-processing unit 620. The multi-channel decoding unit 630 is usable only if an output signal is an audio signal that has at least three multi-channels.

On the other hand, if an output signal is a mono or stereo signal, the multi-channel decoding unit 630 is bypassed but the downmix signal generated from the downmix signal pre-processing unit 620 is outputted intact.

FIG. 7 is a diagram of a structure of syntax according to another embodiment of the present invention.

Referring to FIG. 7, in case that modified object level information is included in object information, an audio signal is decoded not a downmix signal but using a modified object. Therefore, it is able to reduce a used bit for object information being transmitted to a decoder.

Figure 8:
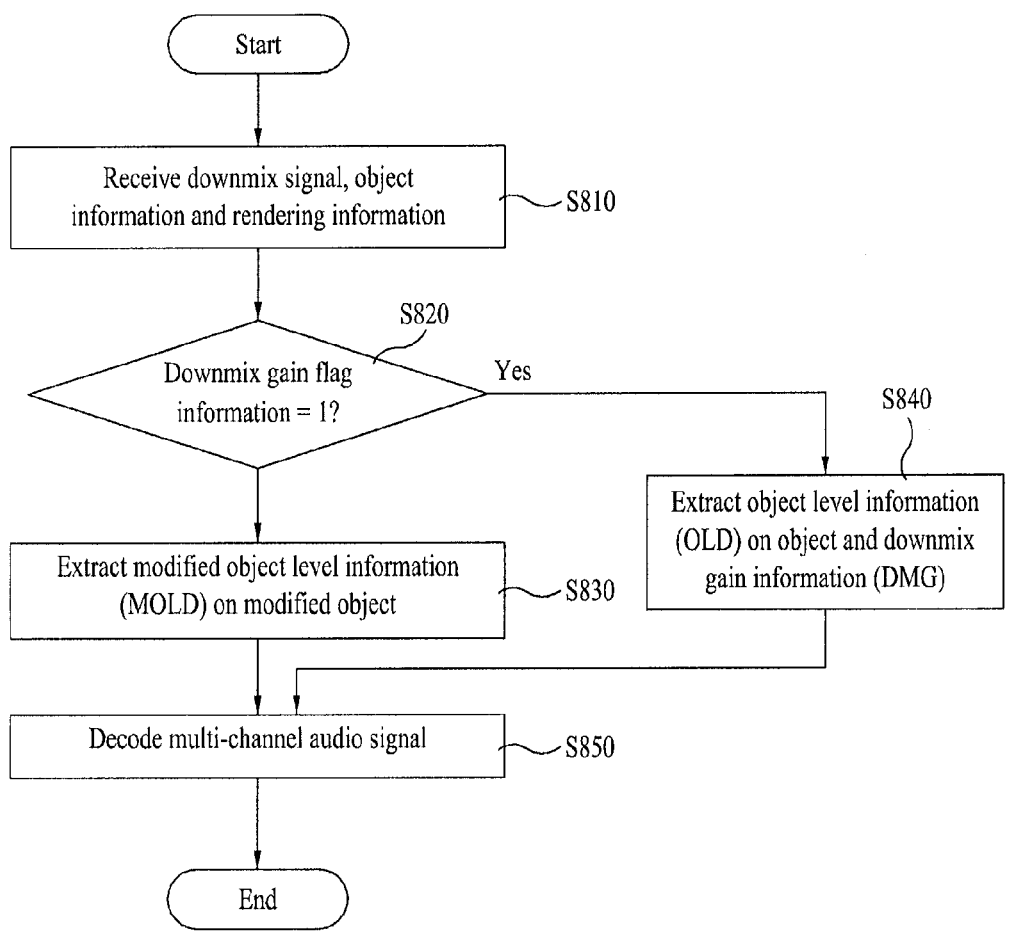
FIG. 8 is a flowchart of a signal decoding method according to FIG. 6.

FIG. 8 is a flowchart of a signal decoding method according to FIG. 6.

Referring to FIG. 8, a downmix signal, object information and rendering information are received [S810]. Downmix gain flag information (DMG_flag) is obtained from the object information and a setup value is then checked [S820]. The downmix gain flag information (DMG_flag) may indicate whether the downmix gain (DMG) is included in the object information (OI) or whether the modified object information [MOLD] is included in the object information (OI).

Meanings of the downmix gain flag information (DMG_flag) are represented in Table 1 and Table 2.

TABLE 1

| DMG_flag | Meaning |
|---|---|
| 1 | DMG is included in OI. |
| 0 | DMG is not included in OI. |

TABLE 2

| DMG_flag | Meaning |
|---|---|
| 1 | OLD is included in OI (MOLD not included). |
| 0 | MOLD is included in OI. |

Based on the downmix gain flag information, if the downmix gain is not included in the object information ['yes', if DMG_flag=1], modified object level information (MOLD) on the modified object ($\hat{S}_i$) is extracted from the object information [S830]. If the downmix gain is included in the object information ['no', if DMG_flag=1], object level information (OLD) on the object and the downmix gain (DMG) are extracted from the object information (OI) [S840].

Moreover, the downmix gain flag information, as shown in Table 2, is able to indicate whether modified object level information (MOLD) is included in object information (OI).

In this case, based on the downmix gain flag information (DMG_flag), if the modified object level information (MOLD) is included in the object information (OI) and if the object level information (OLD) is not included in the object information (OI) ['yes', if DMG_flag=1], modified object level information (MOLD) on a modified object ($\hat{S}_i$) is extracted from the object information [S830].

If the modified object level information (MOLD) is not included in the object information (OI) and if the object level information (OLD) is included in the object information (OI) ['no', if DMG_flag=1], object level information (OLD) on the object and the downmix gain (DMG) are extracted from the object information [S840].

Subsequently, using the extracted modified object level information (MOLD) or the extracted object level information (OLD) and downmix gain (DMG), a multi-channel audio signal is decoded [S850]. In case that the downmix signal is a stereo signal, it is able to decode a multi-channel audio signal by further extracting to use downmix gain difference information from the object information (OI).

Thus, in a signal processing method and apparatus according to another embodiment of the present invention, a signal is decodable using object level information (OLD) and downmix gain (DMG) or modified object level information (MOLD) in accordance with downmix gain flag information (DMG_flag) obtained from object information (On. Therefore, the present invention enables a signal to be efficiently processed according to an environment.

Moreover, a downmix gain can be included in each frame. If a method of generating a downmix signal is uniform within a predetermined time, a single file, a single song or the like, the downmix gain can be constant within a same interval. In this case, including a downmix gain in a frame at a timing point of applying a modified downmix gain will be more effective than including a downmix gain in each frame.

Therefore, a signal processing method/apparatus according to a further embodiment of the present invention can further include downmix gain update flag information (DMG_update_header_flag) indicating whether a downmix gain is updated per frame.

The downmix gain update flag information (DMG_update_header_flag) indicates how the downmix gain is included in the corresponding frame and can be included in a header area of a bitstream. Moreover, the meaning of the downmix gain update flag information can be represented as Table 3, by which examples of the present invention are non-limited.

TABLE 3

| DMG_update_header_flag | Meaning |
|---|---|
| 0 | DMG is same in every frame. |
| 1 | Determine whether DMG is updated, based on downmix gain flag information included in frame |
| 2 | DMG is updated per predetermined period (frames). |
| 3 | DMG is updated per frame. |

Referring to Table 3, if a downmix gain update header flag is set to 0, a downmix gain is same in every frame with a uniform value that is not updated. Hence, a downmix gain (DMG) can be included not in a frame area but in a header area. If a downmix gain update header flag is set to 1, downmix gain frame flag information (DMG_update_frame_flag) indicating whether a downmix gain is updated per frame can be further included. If the downmix gain frame flag information indicates that a corresponding frame includes an updated downmix gain, object information is able to include the updated downmix gain.

If a downmix gain update header flag is set to 2, a downmix gain updated per predetermined frame period set in a header can be included. If a downmix gain update header flag is set to 3, an updated downmix gain updated per frame is included to be usable.

The downmix gain should be understood to generally indicate information relevant to a downmix gain for efficient coding as well as a value of the downmix gain. For instance, in case of using differential coding scheme, a differential value, an interpolation value, an indicator for generating a previous value or the like can be included.

In case that a downmix gain is same in every frame, a downmix gain can be included in a header area without having downmix gain header flag information included in a header area of a bitstream.

The present invention applied decoding/encoding method can be implemented in a program recorded medium as computer-readable codes. And, multimedia data having the data structure of the present invention can be stored in the computer-readable recoding medium. The computer-readable recording media include all kinds of storage devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, a bitstream generated by the encoding method is stored in a computer-readable recording medium or can be transmitted via wire/wireless communication network.

While the present invention has been described and illustrated herein with reference to the preferred embodiments thereof, it will be apparent to those skilled in the art that various modifications and variations can be made therein without departing from the spirit and scope of the invention.

Thus, it is intended that the present invention covers the modifications and variations of this invention that come within the scope of the appended claims and their equivalents.

INDUSTRIAL APPLICABILITY

Accordingly, the present invention is applicable to encoding and decoding of signals.

What is claimed is:

1. A method of processing an audio signal, comprising:
receiving a downmix signal, object information and rendering information;
obtaining downmix gain flag information indicating whether a downmix gain is included in the object information;
generating downmix processing information using the object information and the rendering information based on the downmix gain flag information;
generating multi-channel information using the object information and the rendering information;
generating a processed downmix signal using the downmix processing information and the downmix signal; and
decoding a multi-channel audio signal by applying the multi-channel information to the processed downmix signal,
wherein the object information includes modified object level information or object level information,
wherein the modified object level information is determined using a level of a modified object generated by applying the downmix gain to an object,
wherein the object level information is determined using a level of the object,
wherein the object information further includes object gain difference information indicating a ratio of contributing a left channel and a right channel of a stereo signal, if the downmix signal is a stereo signal, and
wherein the object information includes the modified object level information, if the downmix gain flag information indicates that the downmix gain is not included in the object information.

2. The method of claim 1, wherein the object information includes the object level information and further includes the downmix gain applied to the object, if the downmix gain flag information indicates that the downmix gain is included in the object information.

3. The method of claim 2, wherein the downmix gain exists in a header of a bitstream of the audio signal.

4. An apparatus for processing an audio signal, comprising:
an object information processing unit generating downmix processing information and multi-channel information using object information and rendering information;
a downmix signal pre-processing unit generating a processed downmix signal using a downmix signal and the downmix processing information; and
a multi-channel decoding unit decoding a multi-channel audio signal by applying the multi-channel information to the processed downmix signal generated from the downmix signal pre-processing unit,
wherein the object information includes modified object level information determined using a level of a modified object or object level information determined using a level of an object, based on downmix gain flag information indicating whether a downmix gain is included in the object information, and
wherein the object information further includes object gain difference information indicating a ratio of contributing a left channel and a right channel of a stereo signal, if the downmix signal is a stereo signal, and
wherein the object information includes the modified object level information determined by the modified object, the modified object generated by applying the downmix gain to the object, if the downmix gain flag information indicates that the downmix gain is not included in the object information.

5. The apparatus of claim 4, wherein the object information includes the object level information determined by using a level of the object, if the downmix gain flag information indicates that the downmix gain is included in the object information.

6. A method of processing an audio signal, comprising:
generating a modified object by applying a downmix gain to an object;
generating a downmix signal using the modified object; and
generating object information using the modified object,
wherein the object information includes modified object level information determined by a level of the modified object and downmix gain flag information indicating whether the object information includes the downmix gain, and
wherein the object information further includes object gain difference information indicating a ratio of contributing a left channel and a right channel of a stereo signal, if the downmix signal is a stereo signal, and
wherein the object information does not include the downmix gain, if the downmix gain flag information indicates that the downmix gain is not included in the object information.

7. An apparatus for processing an audio signal, comprising:
a modified object generating unit generating a modified object by applying a downmix gain to an object; and
a modified object level information generating unit determining modified object level information by using a level of the modified object and generating downmix gain flag information indicating whether the downmix gain is transferred,
wherein the modified object level information further includes object gain difference information indicating a ratio of contributing a left channel and a right channel of a stereo signal, if a downmix signal is a stereo signal, and
wherein object information includes the modified object level information determined by the modified object, if the downmix gain flag information indicates that the downmix gain is not included in the object information.

8. A non-transitory computer-readable recording medium including a program recorded therein, wherein the program is configured to execute the steps according to claim 1.

* * * * *